(12) United States Patent
Xu

(10) Patent No.: US 10,322,523 B2
(45) Date of Patent: Jun. 18, 2019

(54) METHOD FOR MAKING NANO VENEER

(71) Applicant: Linyi Youyou Wood Industry Co., Ltd., Linyi (CN)

(72) Inventor: Gui-Xue Xu, Linyi (CN)

(*) Notice: Subject to any disclaimer, the term of this patent is extended or adjusted under 35 U.S.C. 154(b) by 0 days.

(21) Appl. No.: 15/863,162

(22) Filed: Jan. 5, 2018

(65) Prior Publication Data
US 2018/0304492 A1  Oct. 25, 2018

(30) Foreign Application Priority Data

Apr. 21, 2017  (CN) .......................... 2017 1 0263320

(51) Int. Cl.
| | | |
|---|---|---|
| *B05D 3/04* | (2006.01) | |
| *B05D 7/06* | (2006.01) | |
| *B27K 3/00* | (2006.01) | |
| *B27K 3/08* | (2006.01) | |
| *B27K 3/32* | (2006.01) | |
| *B27K 5/00* | (2006.01) | |
| *C09D 1/00* | (2006.01) | |
| *C09D 5/02* | (2006.01) | |
| *C09D 7/40* | (2018.01) | |
| *F26B 3/28* | (2006.01) | |

(52) U.S. Cl.
CPC .............. *B27K 3/08* (2013.01); *B05D 3/0493* (2013.01); *B05D 7/06* (2013.01); *B27K 3/007* (2013.01); *B27K 3/32* (2013.01); *B27K 5/0065* (2013.01); *C09D 1/00* (2013.01); *C09D 5/028* (2013.01); *C09D 7/67* (2018.01); *F26B 3/28* (2013.01); *B05D 2203/20* (2013.01); *B05D 2601/22* (2013.01); *F26B 2210/14* (2013.01)

(58) Field of Classification Search
CPC .... B05D 7/06; B05D 3/0493; B05D 2203/20; B05D 2601/22; B27K 3/007; B27K 3/08; B27K 3/32; B27K 5/0065; B27K 5/0075; F26B 3/28; F26B 2210/14; C09D 5/028; C09D 7/67; C09D 1/00
USPC .................................................. 427/294, 297
See application file for complete search history.

(56) References Cited

FOREIGN PATENT DOCUMENTS

| | | | |
|---|---|---|---|
| CN | 104858950 A | * | 8/2015 |
| CN | 104858953 A | * | 8/2015 |
| CN | 105481339 A | * | 4/2016 |

* cited by examiner

*Primary Examiner* — William P Fletcher, III
(74) *Attorney, Agent, or Firm* — Locke Lord LLP

(57) ABSTRACT

A process for producing nano veneers generally involving: placing a veneer to be treated in a vacuum vessel; adding a nano carbon powder and nano silicon dioxide suspension in the vacuum vessel; reducing the pressure in the vessel over a first period of time; increasing the pressure in the vessel; letting the contents of the vessel rest over a second period of time. The veneer may optionally be subjected to ultrasonic treatment, ultraviolet solidification treatment, or subsequent pressurization treatments to obtain the final nano veneer product. As a result, veneer manufactured using embodiments of the present invention will have the advantages of high strength, wear resistance, pollution resistance, acid and alkali resistance, water segregation and decay resistance.

20 Claims, No Drawings

METHOD FOR MAKING NANO VENEER

CROSS REFERENCE TO RELATED APPLICATIONS

This application claims the benefit of Chinese Patent Application No. 201710263320.X, filed Apr. 21, 2017, which is hereby incorporated by reference as if fully stated herein.

FIELD OF THE INVENTION

The present invention relates to nano veneers and, more particularly, to a method for making nano veneers.

BACKGROUND OF THE INVENTION

Veneer wood is generally known in the furniture and flooring industries as a thin decorative covering of fine wood applied to a coarser wood or other material. Veneer wood is typically a fine, or very thin slice of wood which provides a desirable appearance for furniture or flooring while minimizing the amount of wood necessary for the achieving the desired aesthetic effect. In essence, the veneer wood covers only the very top layer of a piece of furniture or flooring in order to provide a pleasing visual appearance; the layers beneath the veneer may be of a less expensive wood product, such as engineered wood.

There are a variety of ways in which decorative veneer wood may be manufactured. Generally, veneer is manufactured through a process which utilizes an engineered wood base, such as plywood, fiberwood, particle board and the like and affixes a thin decorative layer of veneer wood on top, usually through the use of an adhesive.

One of the primary advantages of using veneer wood over traditional solid hardwood is stability. While flooring or furniture manufactured from a solid piece of hardwood may be prone to warping and/or splitting, veneer is not as susceptible to such problems because it is made of a thin layer of wood over a more stable core, such as thin layers of wood glued together, thereby reducing the chances of warping, splitting or cracking. Additionally, the use of adhesives or other fillers serve to provide additional strength to the overall veneer wood product, making the resulting product stronger than natural hardwood.

Traditionally, the thin decorative layer of veneer is cut (whether by peeling, slicing, rotary cutting or otherwise) from the logs or boards of various species of trees, in order to achieve varying aesthetic effects. However, despite the apparent cost cutting measures associated with the utilization of veneer wood generally, some manufacturers have sought to cut costs further by utilizing an artificially generated pattern printed on paper. Thus, rather than using a thin slice of veneer wood on a plywood base, the decorative "veneer" layer is instead created from a computer generated pattern.

While veneer panels manufactured from computer generated patterns may be more cost-effective, they have less wear resistance and are more susceptible to damage, including damage from scratches, scrapes, scuffs, and the like. In particular, use of this type of veneer wood for flooring may lead to more noticeable aesthetic abrasions over time, thus significantly detracting from the overall aesthetic appeal of the flooring. Additionally, veneer wood manufactured in such a manner does not provide a textured "feel" and instead suffers from a generally smooth and softer surface when compared to veneer wood sliced from genuine hardwood. The smooth, softer surface of such artificial wood products may contribute to a lesser amount of perceived quality by the consumer. Additionally, such deficiencies may lead to a generally more slippery surface which may create safety issues and concerns.

The presently available methods for manufacturing veneer wood are thus unable to provide for veneers with certain compositions which may lead to increased hardness, wear resistance, and longevity, while also minimizing the amount of pollutants released into environment as a result of the manufacturing process.

SUMMARY OF THE INVENTION

The present invention addresses the deficiencies in the veneer manufacturing industry by providing a novel method for making nano veneers. The present invention provides a method of manufacturing veneer wood which produces a veneer product that has increased hardness, wear-resistance, and longevity and which also provides additional benefits such as a more natural, genuine textured feel of real wood, and increased durability and longevity when installed. Veneer wood manufactured through the presently disclosed process will be less susceptible to scratching and damage, and will provide a firm, textured surface which reduces the likelihood of slippage during use. Furthermore, the present invention has the additional benefit of providing a non-toxic manufacturing process which significantly decreases the amount of pollutants released into the environment, as well as providing a safe end-product for daily use by consumers within residential and commercial spaces.

Generally, the present invention teaches a method of making nano veneers comprising the following steps: placing a piece of veneer wood to be treated in a vacuum vessel; adding a mixture of nano carbon powder and nano silicon dioxide suspension into the vacuum vessel; reducing the pressure in the vessel to a predetermined pressure over a first period of time; increasing the pressure in the vessel to a predetermined pressure; leaving the vessel to rest for as second period of time; optionally subjecting the veneer to ultrasonic treatment; optionally subjecting the veneer to ultraviolet (UV) treatment; removing the veneer wood from the vacuum vessel; and drying the veneer to obtain the final veneer wood product.

In a preferred embodiment, the pressure achieved during the reduced pressure phase is 0.05 megal pascals (Mpa), and the pressure achieved during the increased pressure phase is 5 MPa. In a preferred embodiment, the ultrasonic treatment performed is accomplished by way of an ultrasonic homogenizing apparatus. In a preferred embodiment, the solidification treatment performed is by means of a UV solidification apparatus.

The nano veneer made using the embodiments of the present invention has free unsaturated fatty acids in the intercellular substances of the veneer wood which interact with silicon carbide to form a stable substance; both the intercellular substances of the nano veneer and the wood cells contain homogeneous and stable silicon carbide. As a result, veneer wood manufactured using embodiments of the present invention will have the advantages of high strength, wear resistance, pollution resistance, acid and alkali resistance, water segregation, and decay resistance.

DETAILED DESCRIPTION OF ILLUSTRATIVE EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In a preferred embodiment, the present invention provides a method for making veneer wood that generally involves saturating the cells of the veneer wood with nano carbon powder and a nano silicon dioxide suspension under pressure changes within a vacuum vessel. With respect to the nano carbon powder and nano silicon dioxide suspension, the particles may be approximately 30 nm in length, varying between about 25 nanometers (nm) and 35 nm. The nano silicon dioxide suspension may comprise nano silicon dioxide particles dispersed in an aqueous solution, such as water.

The appropriate amount of nano carbon powder and nano silicon dioxide suspension used may be based upon the weight and density of the veneer wood being treated. The density of the veneer wood being treated may be calculated from the total volume of the veneer wood and its weight. Generally, the density of a particular species of the veneer wood may also be obtained from known measurements within the industry, for example 0.72 g/cm^3 for birch wood. After determining the weight and density of the veneer wood to be treated, nano carbon powder may be added in a weight ratio of from about 10 to about 15% of the total weight of the veneer wood. Similarly, nano silicon dioxide may be added in a weight ratio of from about 22 to about 37% of the total weight of the veneer wood, exclusive of the suspension liquid. For instance, if the weight of the veneer wood to be added to the vacuum vessel is 100 kg and the density of the species is 0.72 g/cm^3, then nano carbon powder may be added in an amount varying from 10 to 15 kg and nano silicon dioxide may be added in an amount varying from 22 to 37 kg through the use of the liquid suspension. It may be noted that depending on the species of veneer wood to be treated, the weight ratio of nano carbon powder and nano silicon dioxide suspension may be varied in order to achieve the desired saturation within the veneer wood.

After the veneer wood, nano carbon powder, and nano silicon dioxide suspension are all added to the vessel, the pressure in the vacuum vessel is slowly reduced over approximately one hour to attain a pressure of approximately 0.05 mega pascals (MPa). By way of reference, normal atmospheric pressure at seas level is approximately 0.10 Mpa. The target pressurization is attained gradually in order to achieve uniformity in the pressurization process. This reduction of pressure also causes a natural drop in ambient temperature. Afterward the completion of this first period of reduced pressurization, the vessel is repressurized to a pressure of approximately 5 to 8 MPa, and then immediately left to rest at the increased pressure for a number of hours depending on the type and density of veneer wood utilized. The increase in pressure will naturally cause an increase in ambient temperature. The amount of pressure utilized during re-pressurization may be adjusted depending on the variety of veneer wood in the vessel. Additionally, the period of rest may preferably range from about 5 to about 8 hours for woods having a range of densities. For instance, wood from a Douglas Fir has a relatively softer density of 0.53 g/cm^3 may require less time spent in the rest period, whereas Maple has a comparatively harder density of 0.75 g/cm^3 may require additional time.

During the pressurization process, the fiber holes in the veneer wood will gradually open due to the changes in pressure. Initially, nano-scale carbon powder and silicon dioxide suspension will be unable to effectively enter the fiber holes of the veneer wood. However, once the pressure within the vessel has stabilized, the fiber holes of the veneer wood will gradually become larger due to the natural characteristics of the wood fibers in the presence of near total vacuum. At this point, pressure within the vessel is increased and a siphon effect will cause the nano carbon powder and nano silicon dioxide suspension particles to gradually enter the fiber holes of the veneer wood. Once the rest period has concluded, the vacuum vessel's internal pressure is returned to ambient pressure, whereupon the veneer wood may be removed and allowed to dry.

In certain preferred embodiments, the veneer wood may additionally be subjected to ultrasonic treatment and/or solidification treatment during the rest period while the veneer wood remains under pressurization inside the vacuum vessel. The ultrasonic treatment may be preferably performed using an ultrasonic homogenizing apparatus and the solidification treatment may be preferably performed using an ultraviolet (UV) solidification apparatus. In a preferred embodiment, the ultrasonic treatment and UV solidification treatment may be begun shortly after the beginning of the rest period and be completed prior to the end of the rest period. In another preferred embodiment, the ultrasonic treatment and UV solidification treatment may be performed contemporaneously.

Through this ultrasonic treatment process, the nano carbon powder and nano silicon dioxide suspension particles are encouraged to be more evenly dispersed within the fiber cells of the veneer wood, thereby increasing the uniformity of the particles within the veneer wood. In another preferred embodiment, the ultrasonic treatment may be performed at a power level of about 100 to 200 kW. Use of the about 200 kW ultrasonic treatment forces the nano carbon and nano silicon dioxide particles to collide at high speed. This results in some of the carbon molecules displacing the silicon molecules in the silicon dioxide to form a carbon dioxide gas, which is then released into the vessel and then evacuated. The displaced silicon molecules, in turn, become more stable with the active carbon molecules and silicon carbide molecules. This overall process may be repeated for additional pressurization cycles until the desired qualities and characteristics of the veneer wood are achieved.

The use of ultrasonic treatment varies depending on the species of veneer wood, with certain wood species being more responsive and other wood species being less responsive to ultrasonic treatment. With less responsive wood species, an ultraviolet solidification apparatus may be used in addition to or as an alternative to the ultrasonic treatment. Preferably, the UV solidification process utilizes a multi-angle UV lamp having a wavelength of about 460 nm. When used contemporaneously with an ultrasonic generator of about 30 kW or greater, this combination will induce the destruction of the silicon oxygen bond within the mixture which is replaced by an active carbon to form silicon carbide molecules, and the synthesis of carbon and oxygen will occur to form carbon dioxide which is evacuated from the fiber holes in the veneer wood.

In a first preferred embodiment, a veneer wood to be treated is placed in a vacuum vessel for pressurization and nano carbon powder and nano silicon dioxide suspension are added to the vacuum vessel. The vessel is then pressurized to 0.05 MPa over the course of approximately one hour and subsequently repressurized to approximately 5.00 MPa and left to rest for approximately 5 hours. During this rest period, the veneer wood may be subjected to additional ultrasonic treatment and/or UV treatment while still resting within the vacuum vessel. Prior to the conclusion of the rest period, the optional ultrasonic and/or UV treatment is terminated. After the conclusion of the rest period, the veneer wood is removed from the vacuum vessel and left to dry in order to obtain the veneer wood product.

In a second preferred embodiment, a veneer wood to be treated is placed in a vacuum vessel for pressurization and nano carbon powder and nano silicon dioxide suspension are added to the vacuum vessel. The vessel is then pressurized to 0.05 MPa over the course of approximately one hour and subsequently repressurized to approximately 5.00 MPa and left to rest for approximately 6 hours. During this rest period, the veneer wood may be subjected to additional ultrasonic treatment and/or UV treatment while still resting within the vacuum vessel. Prior to the conclusion of the rest period, the optional ultrasonic and/or UV treatment is terminated. After the conclusion of the rest period, the veneer wood is removed from the vacuum vessel and left to dry in order to obtain the veneer wood product.

In a third preferred embodiment, a veneer wood to be treated is placed in a vacuum vessel for pressurization and nano carbon powder and nano silicon dioxide suspension are added to the vacuum vessel. The vessel is then pressurized to 0.05 MPa over the course of approximately one hour and subsequently repressurized to approximately 5.00 MPa and left to rest for approximately 8 hours. During this rest period, the veneer wood may be subjected to additional ultrasonic treatment and/or UV treatment while still resting within the vacuum vessel. Prior to the conclusion of the rest period, the optional ultrasonic and/or UV treatment is terminated. After the conclusion of the rest period, the veneer wood is removed from the vacuum vessel and left to dry in order to obtain the veneer wood product.

In additional to the disclosed preferred embodiments, in other embodiments, the vessel may be pressurized to 0.05 MPa and then subsequently repressurized to approximately between 5.00 and 8.00 MPa.

When the vessel is pressurized through reducing and then increasing the pressure, the fiber cells in the veneer wood will gradually open up due to the characteristics of the wood itself, and at the same time, a siphon effect will be generated. Depending on the species of wood used, the amount of expansion of the fiber hole of the veneer wood in the vacuum will be different, due to differences in the densities and composition of the wood. Generally, the greater the density and hardness in the wood species utilized, the greater the duration of pressurization during the nano veneer process.

Differences in the veneer wood may be generally due to differences in density and other physical properties. Furthermore, differences in veneer wood may affect the recovery of the fiber cells after the pressurization phase. Thus, depending on the type of veneer wood to be subjected to the presently disclosed process, varying the amounts of nano additives, amount of pressurization, and pressurization times may be needed. In general, the greater the density of the species of wood utilized, the more difficult it will be to open the fiber cells of the veneer wood. Depending on the production time of the nano veneer, the denser wood species may be subjected to ultrasonic treatment and UV treatment during the pressurization process in order to encourage the saturation of the nano additives. Additionally, if the amount of pressure or pressurization time is too great, and depending on the species of veneer wood utilized, the fiber cells of the veneer wood may lose their structural elasticity or even be destroyed under the action of the pressurization, resulting in uneven distribution of nano carbon powder and nano silicon dioxide and generally resulting in an undesirable product. For instance, pine wood, a relatively softer variety of wood may require generally 5 to 6 hours of pressurization whereas hickory wood may require up to 8 hours.

After obtaining the final nano veneer product, the nano veneer may be subjected to tension and compression tests in order to confirm that the intercellular substances and wood cells of the veneers now encompassed homogeneous and stable silicon carbide. The successful integration of nano silicon carbide into the slices of veneer wood results in increased strength, wear resistance, pollution resistance, acid and alkali resistance, water segregation and decay resistance. Further, as a result of the enclosed vessel process taught by the present invention, little to no pollutants are generated as a result.

It will be readily apparent to those skilled in the art that the general principles defined herein may be applied to other embodiments and applications without departing from the spirit and scope of the present invention. Having thus described the exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is contemplated that the appended claims will cover any such modifications or embodiments that fall within the true scope of the invention.

What is claimed is:

1. A method for making veneers, comprising:
    placing a veneer wood in a vacuum vessel;
    adding a nano carbon powder and a nano silicon dioxide suspension to the vacuum vessel;
    reducing the pressure in the vessel to a first pressure over a first period of time;
    maintaining the vessel at the first pressure during the first period of time;
    increasing the pressure in the vessel to a second pressure;
    maintaining the vessel at the second pressure for a second period of time;
    removing the veneer wood from the vacuum vessel; and
    drying the veneer.

2. The method of claim 1 wherein the nano carbon powder added to the vacuum vessel is in a weight ratio of from about 10 to about 15 percent of the total weight of the veneer wood.

3. The method of claim 1 wherein the nano silicon dioxide added to the vacuum vessel is in a weight ratio of from about 22 to about 37 percent of the total weight of the veneer wood.

4. The method of claim 1, wherein the first pressure is about 0.05 mega pascals (MPa).

5. The method of claim 1, wherein the second pressure is about 5.00 to about 8.00 MPa.

6. The method of claim 1, wherein the first period of time is approximately one hour.

7. The method of claim 1, wherein the second period of time is at least five hours.

8. The method of claim 1, further comprising the step of:
    subjecting the veneer wood to an ultrasonic treatment.

9. The method of claim 8, wherein the ultrasonic treatment is performed by an ultrasonic homogenizing apparatus.

10. The method of claim 9, wherein the ultrasonic treatment is performed at a power level of about 100 to 200 kilowatts.

11. The method of claim 1, further comprising the step of:
subjecting the veneer wood to an ultraviolet (UV) solidification treatment.

12. The method of claim 11, wherein the UV solidification treatment is performed by an UV solidification apparatus.

13. The method of claim 12, wherein the UV solidification treatment utilizes a multi-angle UV lamp having a wavelength of about 460 nanometers (nm).

14. A method for making veneers, comprising:
placing a veneer wood in a vacuum vessel;
adding from about 10 to about 15 weight percent (based on the weight of the veneer wood) of a nano carbon powder and from about 22 to about 37 weight percent (based on the weight of the veneer wood) nano silicon dioxide to the vacuum vessel, with the nano silicon dioxide in suspension form;
reducing the pressure in the vessel to a first pressure over a first period of time;
maintaining the vessel at the first pressure during the first period of time;
increasing the pressure in the vessel to a second pressure;
maintaining the vessel at the second pressure for a second period of time of from about 5 to about 8 hours;
removing the veneer wood from the vacuum vessel; and
drying the veneer.

15. The method of claim 14 wherein:
the first pressure is about 0.05 MPa and the first period of time is about an hour.

16. The method of claim 14 wherein the second pressure is from about 5.00 to about 8.00 MPa and the second time period is from about 5 to about 8 hours.

17. The method of claim 14 further comprising the step of:
subjecting the veneer wood to an ultrasonic treatment.

18. The method of claim 14 further comprising the step of:
subjecting the veneer wood to a UV solidification treatment.

19. The method of claim 14 further comprising the step of:
subjecting the veneer wood to an ultrasonic treatment; and
subjecting the veneer wood to a UV solidification treatment contemporaneous with the ultrasonic treatment.

20. The method of claim 19 further comprising the step of:
performing the ultrasonic treatment and UV treatment during the second period of time.

\* \* \* \* \*